United States Patent
Cordier et al.

(10) Patent No.: US 8,925,941 B2
(45) Date of Patent: Jan. 6, 2015

(54) MODULAR INDEPENDENT SUSPENSION AND METHOD OF PRODUCING THE SAME

(71) Applicant: AxleTech International IP Holdings, LLC, Troy, MI (US)

(72) Inventors: Gerard Cordier, Andrézieux-Bouthéon (FR); Lillian Cantuern, Saint Etienne (FR); Philippe Mella, Saint Chamond (FR); Alexandre Courvoisier, Saint Etienne (FR)

(73) Assignee: AxleTech International IP Holdings, LLC, Troy, MI (US)

( * ) Notice: Subject to any disclaimer, the term of this patent is extended or adjusted under 35 U.S.C. 154(b) by 0 days.

(21) Appl. No.: 13/632,377

(22) Filed: Oct. 1, 2012

(65) Prior Publication Data

US 2013/0093154 A1   Apr. 18, 2013

Related U.S. Application Data

(60) Provisional application No. 61/627,529, filed on Oct. 13, 2011.

(51) Int. Cl.
*B62D 21/11* (2006.01)
*B60G 3/20* (2006.01)

(52) U.S. Cl.
CPC .......... *B60G 3/20* (2013.01); *B60G 2200/144* (2013.01); *B60G 2204/19* (2013.01)
USPC ................. 280/124.109; 280/124.1; 180/360

(58) Field of Classification Search
USPC .......... 280/124.1, 124.109, 124.11; 180/360; 296/187.08, 193.07; 89/36.07–36.09, 89/918
See application file for complete search history.

(56) References Cited

U.S. PATENT DOCUMENTS 1,731,962 A    10/1929  Wright
3,921,742 A *  11/1975  May et al. ..................... 180/234

(Continued)

FOREIGN PATENT DOCUMENTS

| | | |
|---|---|---|
| EP | 1627762 A2 | 2/2006 |
| FR | 2894927 A1 | 6/2007 |
| WO | 2006041441 A1 | 4/2006 |

OTHER PUBLICATIONS

Column article "A Surprising New Active Suspension" by Csaba Csere, dated Oct. 2004, in Car and Driver Magazine, available at http://www.caranddriver.com/columns/a-surprising-new-active-suspension.*

(Continued)

*Primary Examiner* — Paul N Dickson
*Assistant Examiner* — Darlene P Condra
(74) *Attorney, Agent, or Firm* — Ingrassia, Fisher & Lorenz, P.C.

(57) ABSTRACT

A method of producing a modular independent suspension having portal wheel ends is disclosed herein. The method includes, but is not limited to, assembling a first flank component and a second flank component to opposite sides of a sub-frame configured to receive a carrier. The method further includes assembling a first upper control arm and a first lower control arm to the first flank component. The method further includes assembling a second upper control arm and a second lower control arm to the second flank component. The method further includes assembling a first portal wheel end to the first upper control arm and the first lower control arm. The method still further includes assembling a second portal wheel end to the second upper control arm and the second lower control arm.

5 Claims, 10 Drawing Sheets

(56) References Cited

U.S. PATENT DOCUMENTS

| | | | |
|---|---|---|---|
| 4,733,743 A * | 3/1988 | Weiss et al. | 180/255 |
| 6,516,914 B1 | 2/2003 | Andersen et al. | |
| 6,752,235 B1 * | 6/2004 | Bell et al. | 180/360 |
| 6,886,655 B2 * | 5/2005 | Varela et al. | 180/343 |
| 6,964,317 B2 * | 11/2005 | Groves et al. | 180/344 |
| 7,048,087 B2 * | 5/2006 | Brill | 180/371 |
| 7,364,528 B2 * | 4/2008 | Brill et al. | 475/332 |
| 7,819,411 B2 * | 10/2010 | Eshelman et al. | 280/124.135 |
| 8,276,927 B1 * | 10/2012 | Noble et al. | 280/124.116 |
| 2006/0207384 A1 * | 9/2006 | Hardy et al. | 74/640 |
| 2007/0235972 A1 | 10/2007 | Schmitz | |
| 2009/0020973 A1 * | 1/2009 | Richardson | 280/124.17 |
| 2009/0029821 A1 | 1/2009 | Martin, III et al. | |
| 2009/0230650 A1 * | 9/2009 | Mayen et al. | 280/124.1 |
| 2010/0007198 A1 * | 1/2010 | Armfield | 301/132 |
| 2011/0079978 A1 | 4/2011 | Schreiner et al. | |
| 2011/0115258 A1 * | 5/2011 | Ohhama et al. | 296/193.07 |
| 2011/0169240 A1 * | 7/2011 | Schreiner et al. | 280/124.11 |

OTHER PUBLICATIONS

European Patent Office, Extended European Search Report issued in European Patent Application No. 12 188 010.8-1755, dated Feb. 12, 2013.

* cited by examiner

US 8,925,941 B2

MODULAR INDEPENDENT SUSPENSION AND METHOD OF PRODUCING THE SAME

CROSS REFERENCE TO RELATED CASES

This application claims the benefit of U.S. Provisional Application No. 61/627,529, filed Oct. 13, 2011, U.S. Provisional Application No. 61/545,400, filed Oct. 10, 2011, and U.S. Provisional Application No. 61/593,100 filed Jan. 31, 2012, each of which are hereby incorporated herein by reference in their entirety.

TECHNICAL FIELD

The technical field generally relates to vehicles and more particularly relates to a modular independent suspension axle for a vehicle having portal wheel ends.

BACKGROUND

It is desirable to provide vehicles such as military vehicles, off-road vehicles, agricultural vehicles, emergency-response vehicles, and other vehicles that need to be driven off-road with an independent suspension that provides significantly more ground clearance than is currently provided by conventional independent suspensions. Because of the wide array of vehicles that would benefit from such a suspension and because of the large variation in the size and the specifications of such vehicles, it is further desirable to provide an independent suspension that not only provides substantial ground clearance, but whose configuration can be tailored to accommodate the specific dimensions of the vehicle that the suspension will be attached to.

SUMMARY

Various non-limiting embodiments of a modular independent suspension having portal wheel ends and various non-limiting embodiments of methods for making a modular independent suspension having portal wheel ends are disclosed herein.

In a first non-limiting embodiment, the method includes, but is not limited to, assembling a first flank component and a second flank component to opposite sides of a sub-frame that is configured to receive a carrier. The method further includes, but is not limited to, assembling a first upper control arm and a first lower control arm to the first flank component. The method further includes, but is not limited to, assembling a second upper control arm and a second lower control arm to the second flank component. The method further includes, but is not limited to, assembling a first portal wheel end to the first upper control arm and the first lower control arm. The method still further includes, but is not limited to, assembling a second portal wheel end to the second upper control arm and the second lower control arm.

In another non-limiting embodiment, the modular independent suspension includes, but is not limited to, a sub-frame that is configured to receive a carrier. The sub-frame has a first side and a second side. The modular independent suspension further includes, but is not limited to, a first spacer component that is coupled to the first side of the sub-frame. The modular independent suspension further includes, but is not limited to, a second spacer component that is coupled to the second side of the sub-frame. The modular independent suspension further includes, but is not limited to, a first flank component that is coupled to the first spacer component. The modular independent suspension further includes, but is not limited to, a second flank component that is coupled to the second spacer component. The modular independent suspension further includes, but is not limited to, a first control arm assembly that is coupled to the first flank. The modular independent suspension further includes, but is not limited to, a second control arm assembly that is coupled to the second flank. The modular independent suspension further includes, but is not limited to, a first portal wheel end that is coupled to the first control arm. The modular independent suspension still further includes, but is not limited to, a second portal wheel end coupled to the second control arm assembly.

In another non-limiting embodiment, the modular independent suspension includes, but is not limited to, a sub-frame that is configured to receive a carrier. The sub-frame has a first side and a second side. The first side defines a first plurality of sub-frame bolt holes and the second side defines a second plurality of sub-frame bolt holes. The modular independent suspension further includes, but is not limited to, a first flank component having a first plurality of first flank bolt holes that are configured to align with less than all of the first plurality of sub-frame bolt holes. The first plurality of first flank bolt holes is aligned with a first subset of the first plurality of sub-frame bolt holes. The first flank component is coupled to the first side of the sub-frame via a first plurality of fasteners extending through the first plurality of first flank bolt holes and the first subset of the first plurality of the sub-frame bolt holes. The modular independent suspension further includes, but is not limited to, a second flank component having a second plurality of second flank bolt holes configured to align with less than all of the second plurality of sub-frame bolt holes. The second plurality of second flank bolt holes are aligned with a second subset of the second plurality of sub-frame bolt holes and the second flank component is coupled to the second side of the sub-frame via a second plurality of fasteners extending through the second plurality of second flank bolt holes and the second subset of the second plurality of the sub-frame bolt holes. The modular independent suspension further includes, but is not limited to, a first control arm assembly coupled to the first flank. The modular independent suspension further includes, but is not limited to, a second control arm assembly coupled to the second flank. The modular independent suspension further includes, but is not limited to, a first portal wheel end coupled to the first control arm. The modular independent suspension still further includes, but is not limited to, a second portal wheel end coupled to the second control arm assembly.

BRIEF DESCRIPTION OF THE DRAWINGS

The present invention will hereinafter be described in conjunction with the following drawing figures, wherein like numerals denote like elements, and wherein.

DETAILED DESCRIPTION OF THE DRAWINGS

The following detailed description is merely exemplary in nature and is not intended to limit the invention or the application and uses of the invention. Furthermore, there is no intention to be bound by any theory presented in the preceding background or the following detailed description.

Various embodiments of a modular independent suspension having portal wheel ends and various embodiments of methods for producing a modular independent suspension having portal wheel ends are disclosed herein. The combination of a fully independent suspension with portal wheel ends provides the advantages of permitting each wheel to move vertically independently of one another while also providing the vehicle with superior ground clearance as compared with the ground clearance provided by a suspension having conventional wheel ends (i.e., a suspension where the wheel ends are coaxially aligned with a central axis of the suspension). By producing and/or selling the disclosed independent suspension as single a modular unit, their utility is greatly enhanced. Such a modular independent suspension has the advantage of being able to be bolted directly to a vehicle while out in the field rather than having to return the vehicle from the field to perform time consuming and/or complicated mechanical disassembly and reassembly of one or more components of a suspension.

In addition, embodiments of the modular independent suspension disclosed herein can be tailored to accommodate vehicles having different dimensions. For example, by including spacer components in the independent suspension, the dimensions of the independent suspension can be adjusted to accommodate vehicles having different track widths. Also, by providing multiple bolt holes on the sub-frame of the independent suspension, the height of the suspension can be adjusted to suit the specific needs of the vehicle to which the modular independent suspension is being attached to.

A greater understanding of the embodiments of the modular independent suspension having portal wheel ends and the embodiments of the method for producing the modular independent suspension having portal wheel ends may be obtained through a review of the illustrations accompanying this application together with a review of the detailed description that follows.

Figure 1:
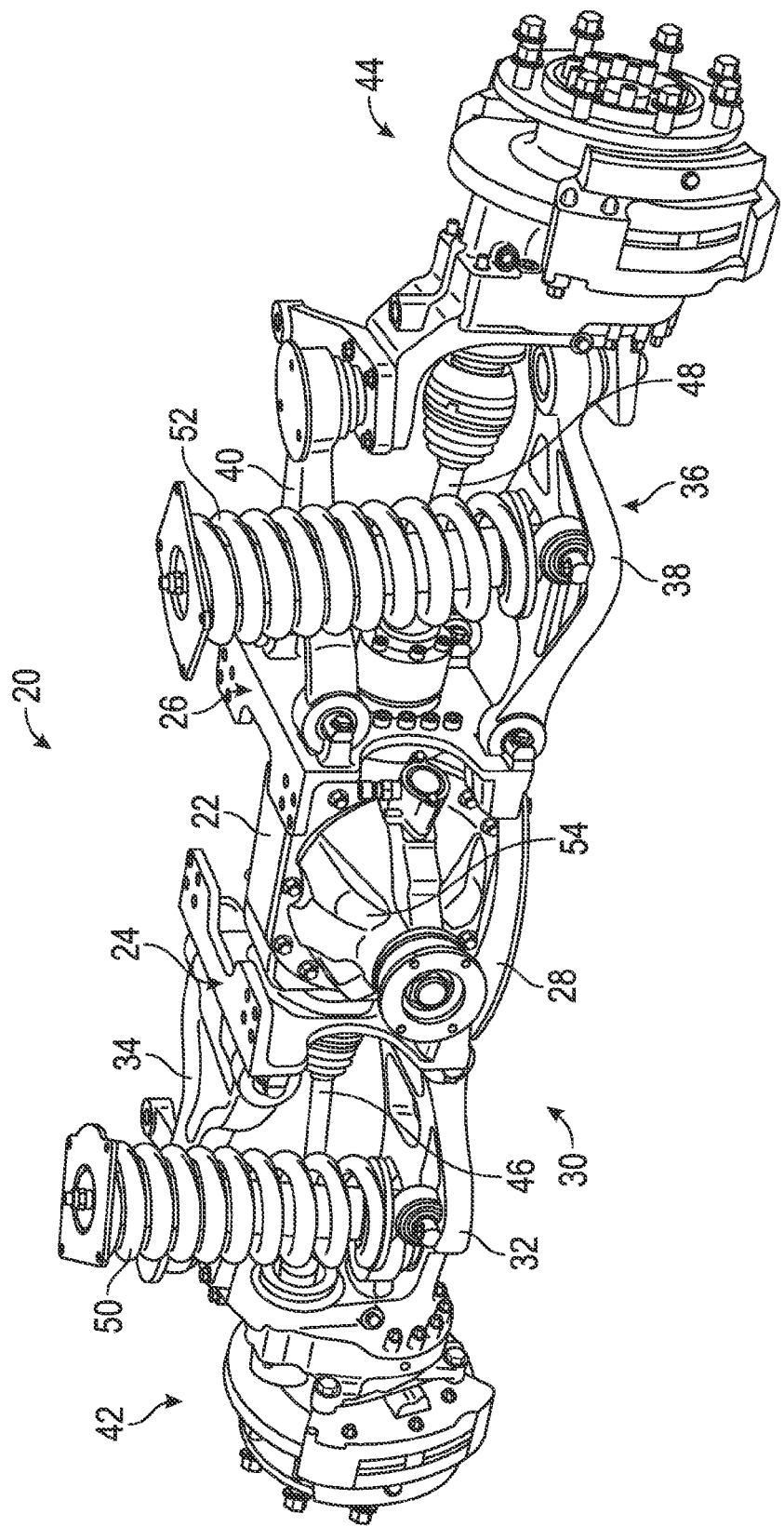
FIG. 1 is a perspective view illustrating an exemplary embodiment of a modular independent suspension having portal wheel ends made in accordance with the teachings of the present disclosure.

FIG. 1 is a perspective view of a non-limiting embodiment of a modular independent suspension 20 having portal wheel ends made in accordance with the teachings of the present disclosure. Modular independent suspension 20 includes a sub-frame 22, a flank component 24, a flank component 26, a cross-member 28, a control arm assembly 30 including a lower control arm 32 and an upper control arm 34, a control arm assembly 36 including a lower control arm 38 and an upper control arm 40, a portal wheel end 42, a portal wheel end 44, a half shaft 46, a half shaft 48, a spring 50 and a spring 52. These various components are assembled and mounted together using various additional components such as bolts, fasteners, bushings, as discussed below.

In the embodiment illustrated in FIG. 1, the carrier 54 (also known as a differential) is assembled to sub-frame 22. Carrier 54 is configured to deliver torque to half shafts 46 and 48 which, in turn, deliver the torque to portal wheel ends 42 and 44. In some embodiments, half shafts 46 and 48 may comprise Cardan joints while in other embodiments, half shafts 46 and 48 may comprise constant velocity joints. Control arm assemblies 30 and 36 permit independent vertical movement of portal wheel ends 42 and 44, respectively as portal wheel ends 42 and 44 encounter undulating surfaces and non-uniform terrain.

Figure 2:
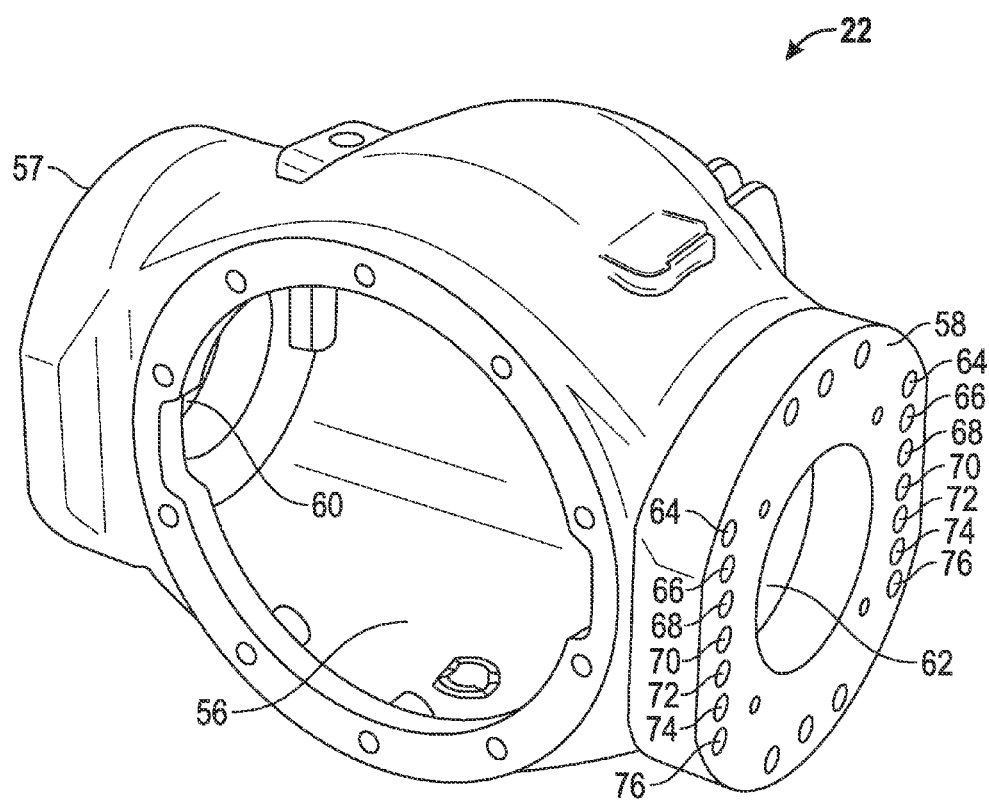
FIG. 2 is a perspective view illustrating an exemplary embodiment of a sub-frame for use in the modular independent suspension of FIG. 1

FIG. 2 is a perspective view illustrating a sub-frame 22. With continuing reference to FIG. 1, sub-frame 22 is a substantially hollow structure comprised of a metal material and that is contoured and configured to accommodate the mechanical structures and components of carrier 54. Sub-frame 22 has an opening 56 to receive carrier 54. Sub-frame 22 has a left side 57 and the right side 58. A bore 60 is defined through left side 56 to receive an end of half shaft 46. Similarly, a bore 62 is defined through right side 58 to receive an end of half shaft 48. In this manner, half shaft 46 and half shaft 48 may be coupled with carrier 54 to facilitate the transmission of torque from carrier 54 to portal wheel ends 42 and 44.

Visible in FIG. 2 are seven pairs of bolt holes 64, 66, 68, 70, 72, 74, and 76 defined in right side 58 and arranged in a vertical orientation. It should be understood that seven corresponding pairs of bolt holes are also defined in left side 57. These bolt holes are provided to permit the attachment of flank components 24 and 26 to left side 57 and to right side 58, respectively. In some embodiments, as discussed below, instead of attaching flank components to left side 57 and right side 58, spacer components may be attached to left side 57 and right side 58 to accommodate vehicles having different tracks. It should also be understood that in other embodiments, a greater or lesser number of pairs of bolt holes may be provided.

By providing numerous pairs of bolt holes, a manufacturer has the flexibility to attach flank components 24 and 26 to sub-frame 22 at varying heights with respect to sub-frame 22. This may be accomplished by providing fewer than seven pairs of bolt holes in each flank component (or in each spacer component). For example, only four pairs of bolt holes may be provided in each flank component. The four pairs of bolt holes will align with four consecutive pairs of bolt holes in left side 57 and right side 58. By aligning the four pairs of bolt holes of each flank component with four consecutive bolt holes out of the seven consecutive pairs of bolt holes defined in left side 57 and right side 58, a manufacturer may give each modular independent suspension a desired height. In this manner, the manufacturer can tailor the height of each modular independent suspension manufactured to the needs of each customer without the necessity of manufacturing or obtaining special parts needed to alter the configuration of the suspension. Furthermore, a customer purchasing the modular independent suspension disclosed and described herein may disassemble the flank components from the sub-frame and may change the height of the modular independent suspension as desired without the need to purchase new components.

Figure 3:
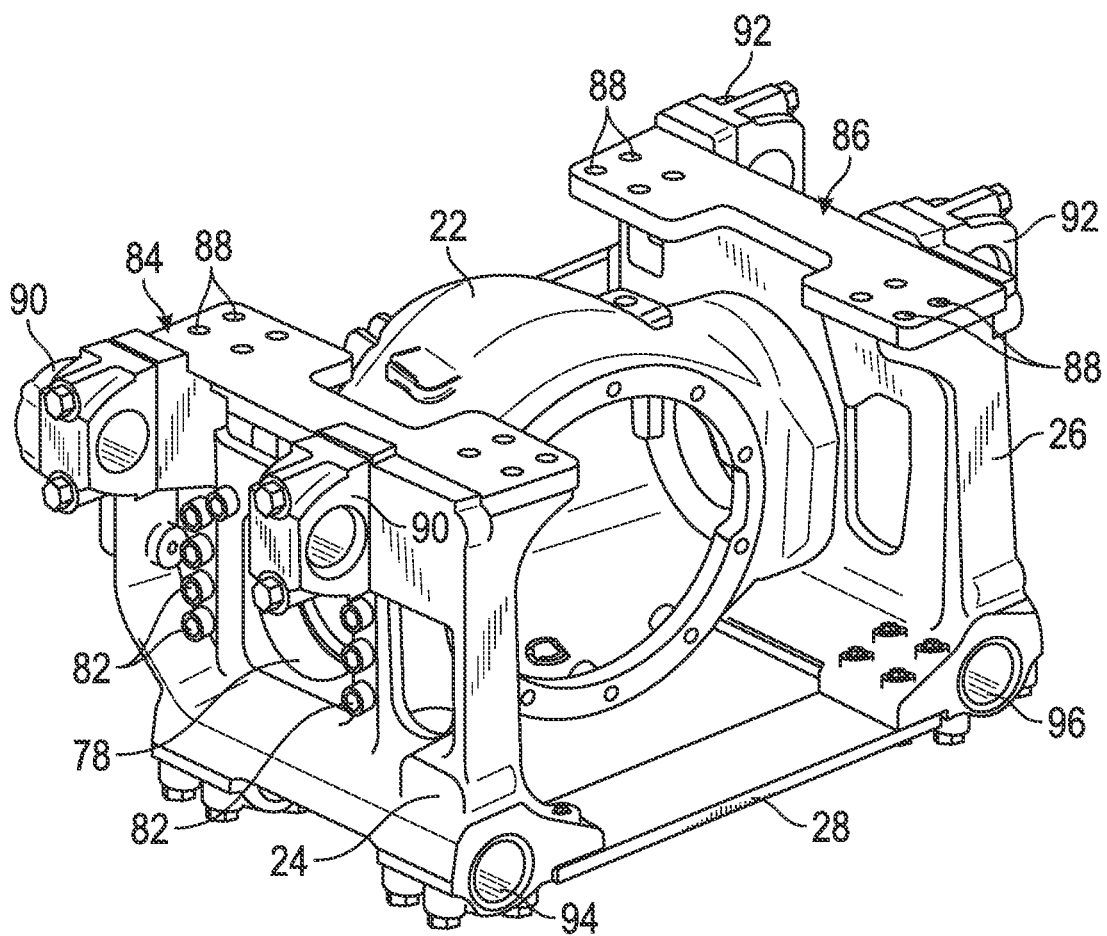
FIG. 3 is a front perspective view illustrating the sub-frame of FIG. 2 assembled to right and left side flank components.

FIG. 3 is a perspective view illustrating flank component 24 and flank component 26 assembled to sub-frame 22. In the illustrated embodiment, flank components 24 and 26 are fabricated from metal materials and are bolted to sub-frame 22 via bolts 82. With continuing reference to FIGS. 1-2, flank component 24 defines a bore 78 and flank component 26 defines a bore 80 (see FIGS. 8 and 9). Bores 78 and 80 provide half shafts 46 and 48 with a pathway to access bore 60 and 62, respectively.

Flank component 24 and flank component 26 include a flange 84 and a flange 86, respectively. Flanges 84 and 86 each include a plurality of bolt holes 88 which are configured to permit flanges 84 and 86 to be bolted to the hull of a vehicle. This facilitates the attachment of, and the disassembly of, modular independent suspension 20 to and from a vehicle.

Also illustrated in FIG. 3 is cross-member 28. In the illustrated embodiment, cross-member 28 is fabricated from a metal material and couples flank component 24 to flank component 26. Cross-member 28 strengthens the connection between flank component 24 and flank component 26, thereby imparting greater strength and stiffness to modular independent suspension 20.

Also illustrated in FIG. 3 are mounting brackets 90 and 92 which are configured to receive upper control arms 34 and 40, respectively. Additionally, mounting points 94 and 96 are configured to receive lower control arms 32 and 38 respectively. Configured in this manner, control arm assemblies 30 and 36 may be attached to the assembly of sub-frame 22 and flank components 24 and 26.

Figure 4:
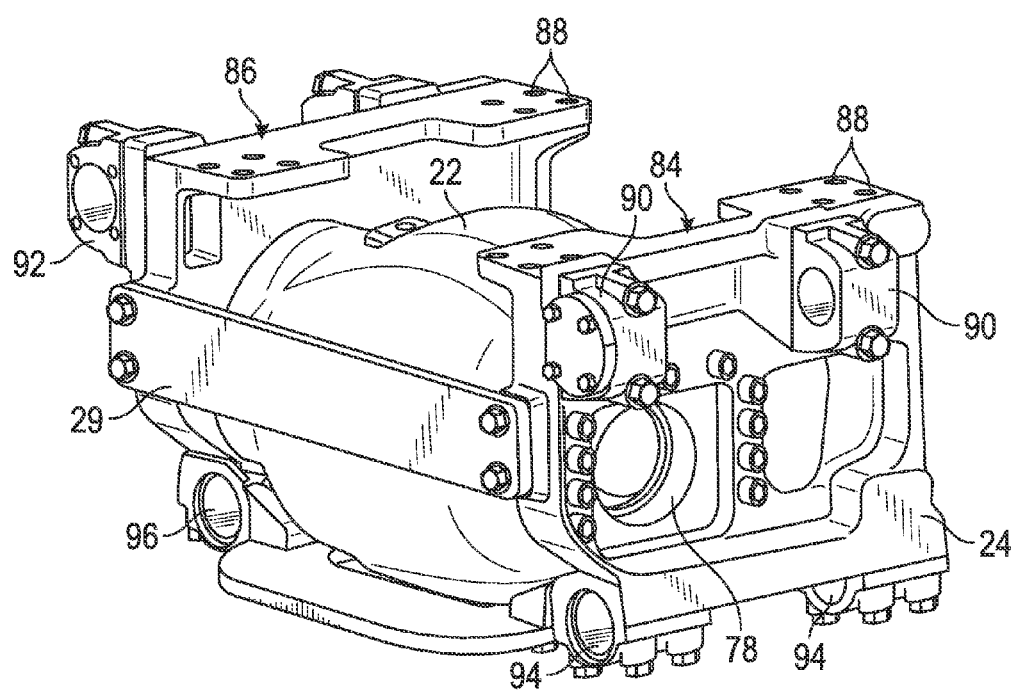
FIG. 4 is a rear perspective view illustrating the sub-frame of FIG. 2 assembled to right and left side flank components.

FIG. 4 is a perspective view illustrating the assembly of flank components 24 and 26 and sub-frame 22 of FIG. 3 from a rear perspective. As illustrated, a second cross-member (cross-member 29) is attached to a rear portion of flank component 24 and to a rear portion of flank component 26. Cross-member 29 strengthens the connection between flank components 24 and flank component 26 and thereby imparts even greater strength and stiffness to modular independent suspension 20.

Figure 5:
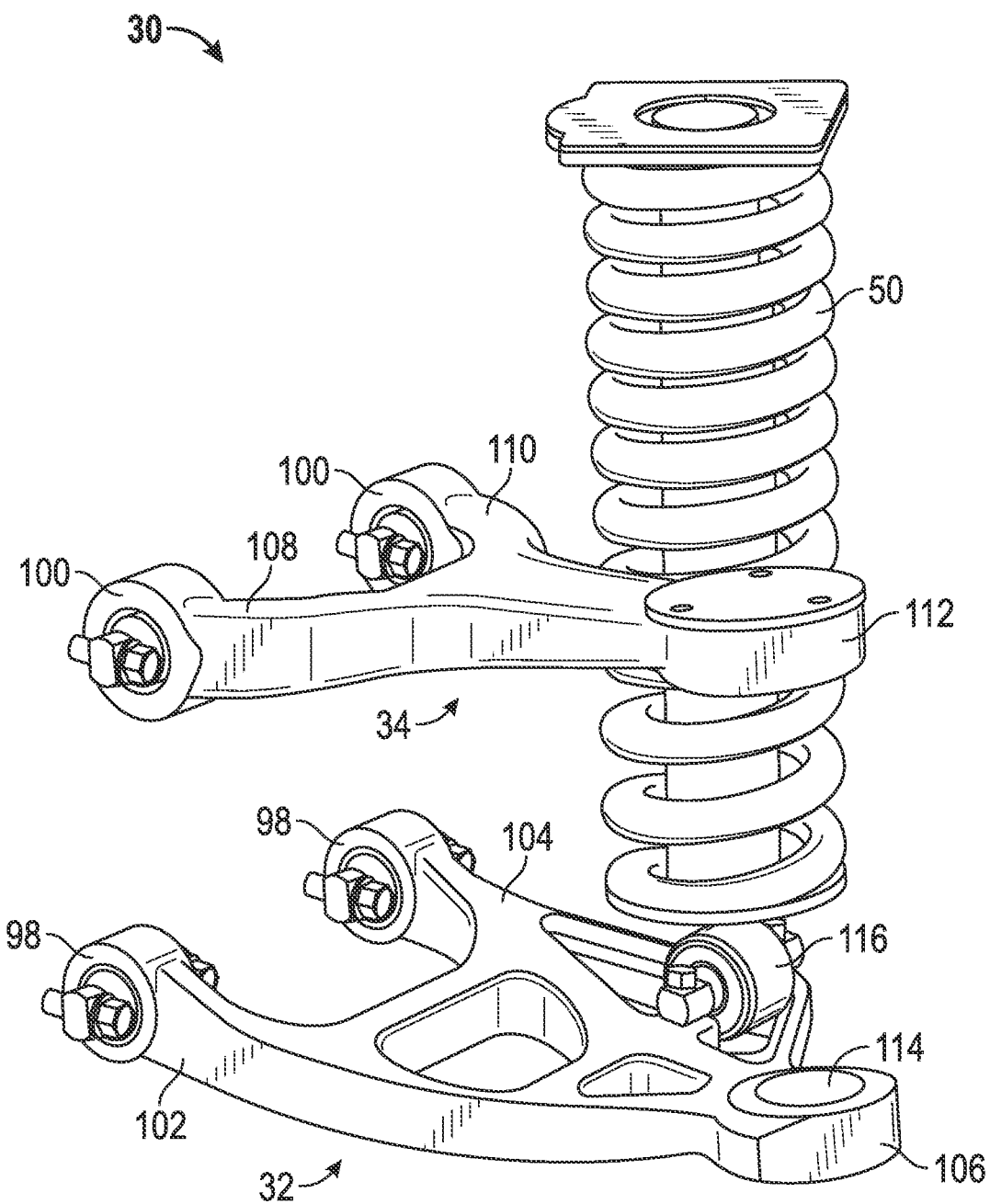
FIG. 5 is a perspective view illustrating a control arm assembly.

FIG. 5 is a perspective view of control arm assembly 30. With continuing reference to FIGS. 1-4, it should be understood that control arm assembly 36 is substantially a mirror image of control arm assembly 30 and, for the purposes of brevity, only control arm assembly 30 will be described.

Control arm assembly 30 includes lower control arm 32, upper control arm 34 and spring 50. Lower control arm 32 includes bushings 98 which are configured to engage mounting point 94 of flank component 24. Correspondingly, upper control arm 34 includes bushings 100 that are configured to engage mounting brackets 90 of flank component 24. Bushings 98 and 100 permit lower control arm 32 and upper control arm 34 to pivot with respect to flank component 24. This ability to pivot is what permits each wheel of modular independent suspension 20 to independently travel vertically in response to road undulations and/or other topographical features without causing a corresponding vertical movement on the part of the other wheel.

Lower control arm 32 includes a lower leg 102 and a lower leg 104 extending from bushings 98 and converging at a lower core 106. Similarly, upper control arm 34 has an upper leg 108 and upper leg 110 that converge at an upper core 112. Lower core 106 defines a bore 114 and upper core 112 defines a bore (not visible in FIG. 5) which is configured to receive lower and upper ball joints, respectively (see FIG. 8).

Spring 50 is coupled, at a lower end, to lower control arm 32 by a spring bushing 116. An upper end of spring 50 is configured to be attached to the vehicle, for example, the vehicle's hull.

Figure 6:
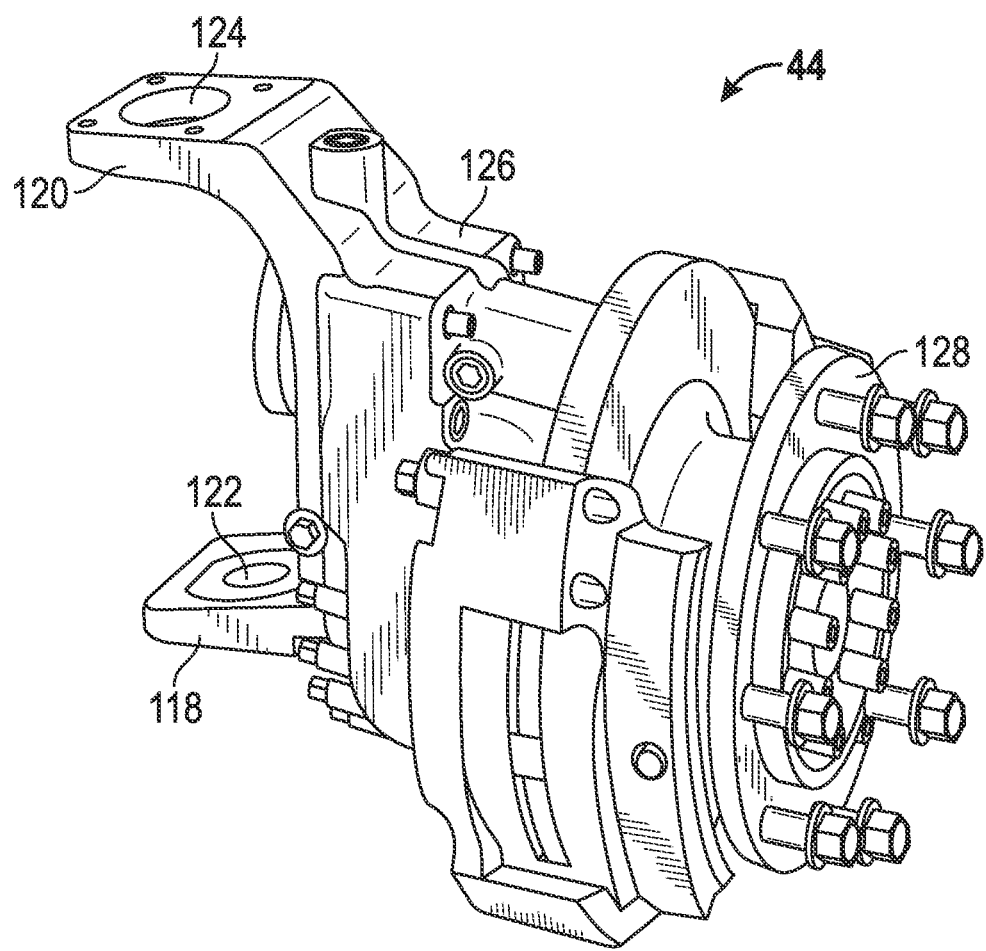
FIG. 6 is a perspective view illustrating a portal wheel end.

FIG. 6 illustrates a perspective view of portal wheel end 44. Portal wheel end 44 and portal wheel end 42 are substantially mirror images of one another. Therefore, for the sake of brevity, only portal wheel end 44 will be discussed in detail.

It should be understood that the details and features described with respect to portal wheel end 44 are also applicable to portal wheel end 42.

Portal wheel end 44 includes a lower extension 118 and an upper extension 120 spaced apart from one another. With continuing reference to FIGS. 1-5, lower extension 118 and upper extension 120 each extend in an outward direction towards control arm assembly 36. In addition, upper extension 120 also extends in an upward direction. Lower extension 118 is configured to couple with lower core 106 and includes a lower extension bore 122 to facilitate such coupling. Similarly, upper extension 120 is configured to couple with upper core 112 and includes an upper extension bore 124 to facilitate such coupling. A ball joint may be inserted into lower extension bore 122 and lower core bore 114 to couple lower extension 118 to lower core 106. Similarly, a ball joint may be inserted into upper extension bore 124 and into upper core bore (not shown) to couple upper extension 120 to upper core 112.

Portal wheel end 44 further includes a housing 126. Housing 126 includes an input gear (not shown) and an output gear (not shown). The input gear is coupled to have shaft 48 and through this coupling receives torque from half shaft 48. The output gear is coupled to the input gear and receives rotational input from the input gear. A wheel hub 128 is coupled to the output gear and receives rotational input from the output gear. Both the output gear and wheel hub 128 are rotatable about a rotational axis that is offset from the rotational axis of half shaft 48 and, by extension, from a central axis of modular independent suspension 20. This offset of the rotational axis of the output gear and wheel hub 128 increases the height of modular independent suspension 20 and, consequently, the height of a vehicle to which modular independent suspension 20 is attached.

Figure 7:
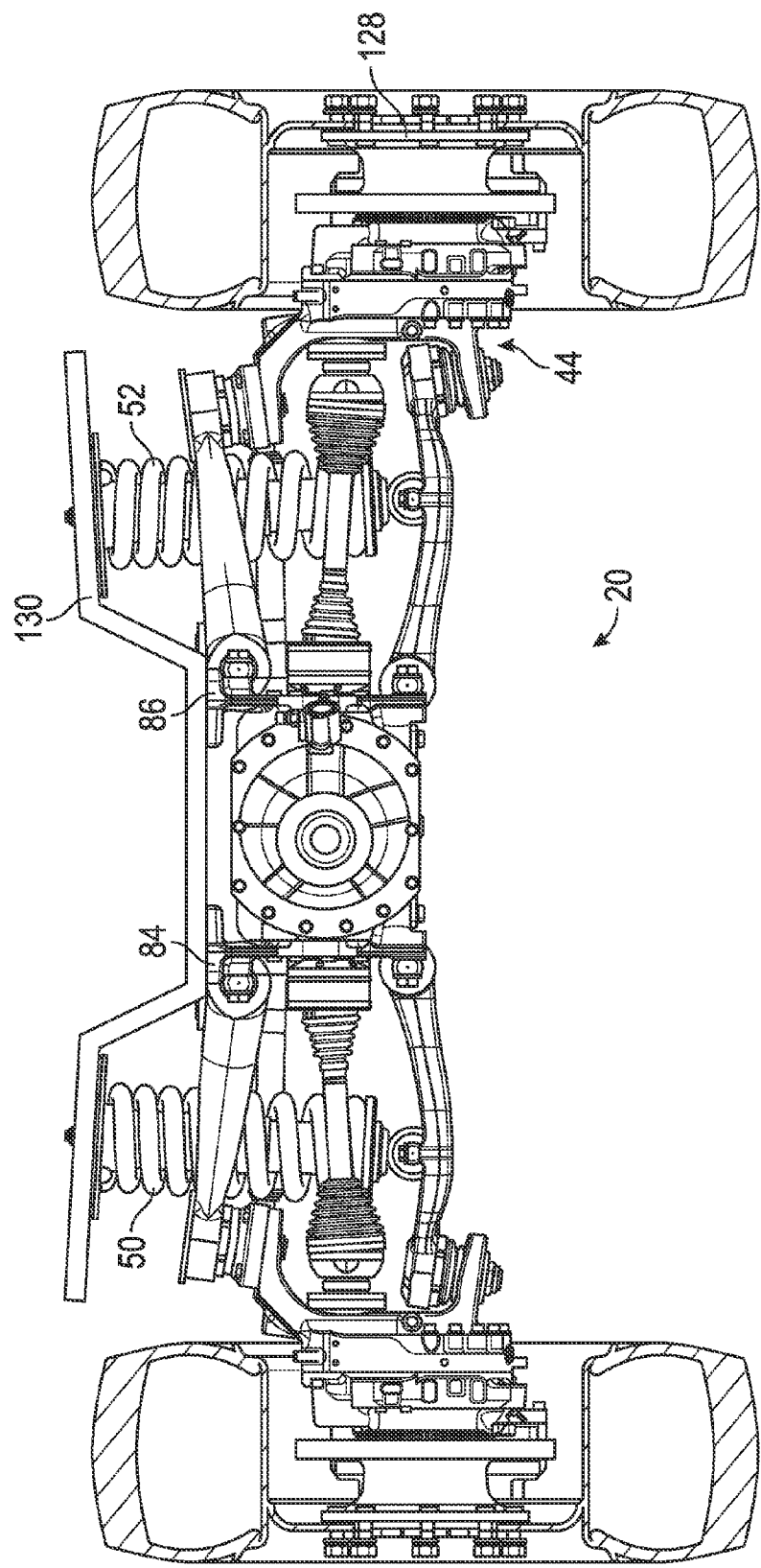
FIG. 7 is a front view illustrating the modular independent suspension of FIG. 1 mounted to a vehicle.

FIG. 7 illustrates modular independent suspension 20 attached to a vehicle 130. For ease of illustration, only a lower most portion of the hull of vehicle 130 is illustrated. In the illustrated embodiment, the hull of vehicle 130 is attached to modular independent suspension 20 at only four locations. The vehicle hull is connected to modular independent suspension 20 at the upper ends of springs 50 and 52 and also at flanges 84 and 86. Configured in this manner, modular independent suspension 20 may easily be attached to, and removed from the vehicle 130.

Figure 8:
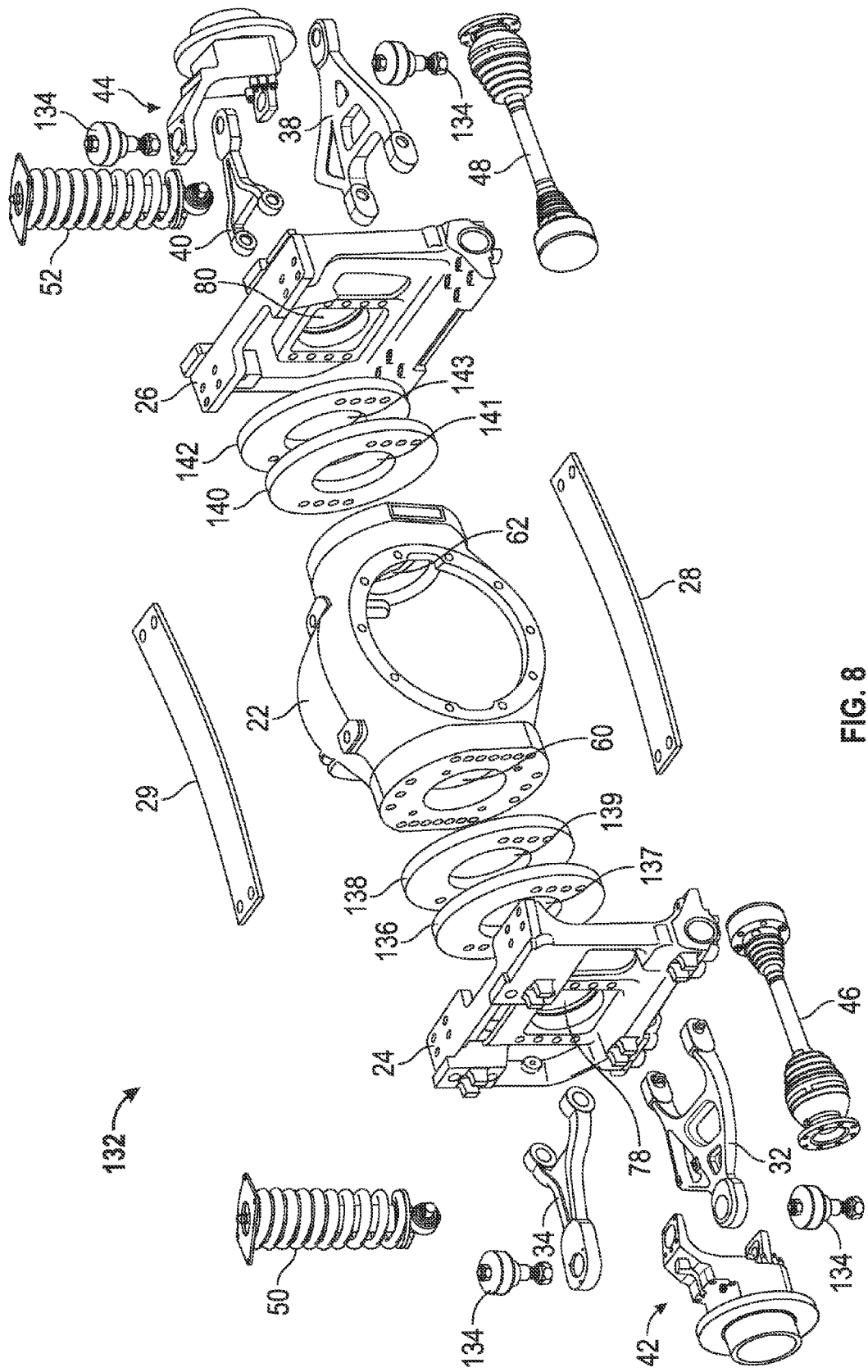
FIG. 8 is an exploded view illustrating an alternate embodiment of the modular independent suspension of FIG. 1 equipped with spacer components.

FIG. 8 is an exploded view of an alternate embodiment 132 of a modular independent suspension made in accordance with the teachings of the present disclosure. In this view, ball joints 134 are illustrated. Ball joints 134 are configured to couple upper control arms 34 and 40 to the upper extensions of portal wheel ends 42 and 44 and also to couple lower control arms 32 and 38 to the lower extensions of portal wheel ends 42 and 44.

With continuing reference to FIGS. 1-7, an additional feature present in alternate embodiment 132 is the presence of spacer components 136, 138, 140, and 142. These spacer components are generally disk-like in configuration and are fabricated from metal materials. In other embodiments, rather than having a disk-like configuration, the spacer components may have any other suitable configuration.

Each spacer component is configured to be mounted to sub-frame 22 and to flank components 24 and 26. Additionally, the spacer components may be mounted to one another which permits the positioning of multiple spacer components between sub-frame 22 and the flank components. By positioning one or more spacer components between sub-frame 22 and flank components 24 and 26, the width of modular independent suspension 20 can be increased to accommodate vehicles having different widths.

Each spacer component has a central bore extending therethrough (e.g., central bore 137, central bore 139, central bore 141, and central bore 143). The central bores of the spacer components are configured to align with the bores of the flank components as well as bores 60 and 62 of sub-frame 22. The presence of central bores in each of the spacer components and the alignment of the central bores of each of the spacer components with the bores of the flank components and the sub-frame provide a substantially unobstructed pathway for the extension of half shafts 46 and 48 from portal wheel ends 42 and 44 to left side 57 and right side 58 of sub-frame 22.

Figure 9:
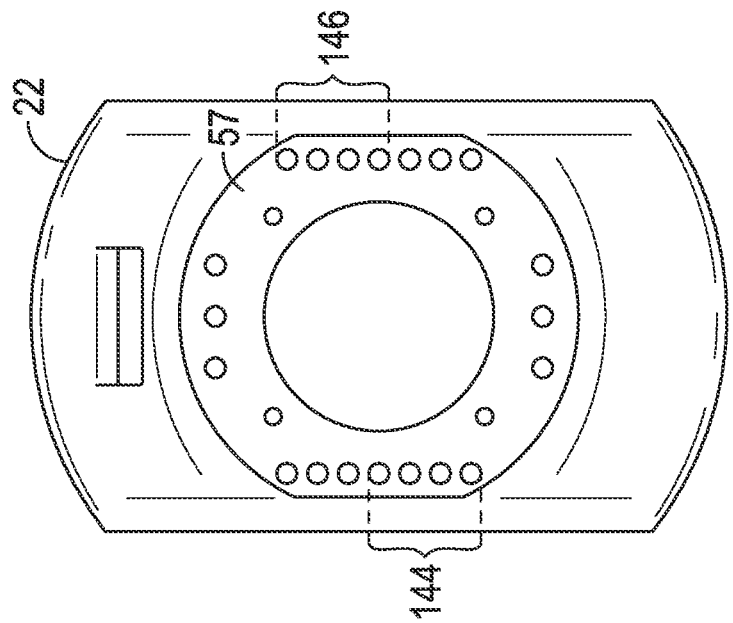
FIG. 9 is a perspective view illustrating various mounting options for mounting a flank component and/or a spacer component to a sub-frame.
Figure 9:
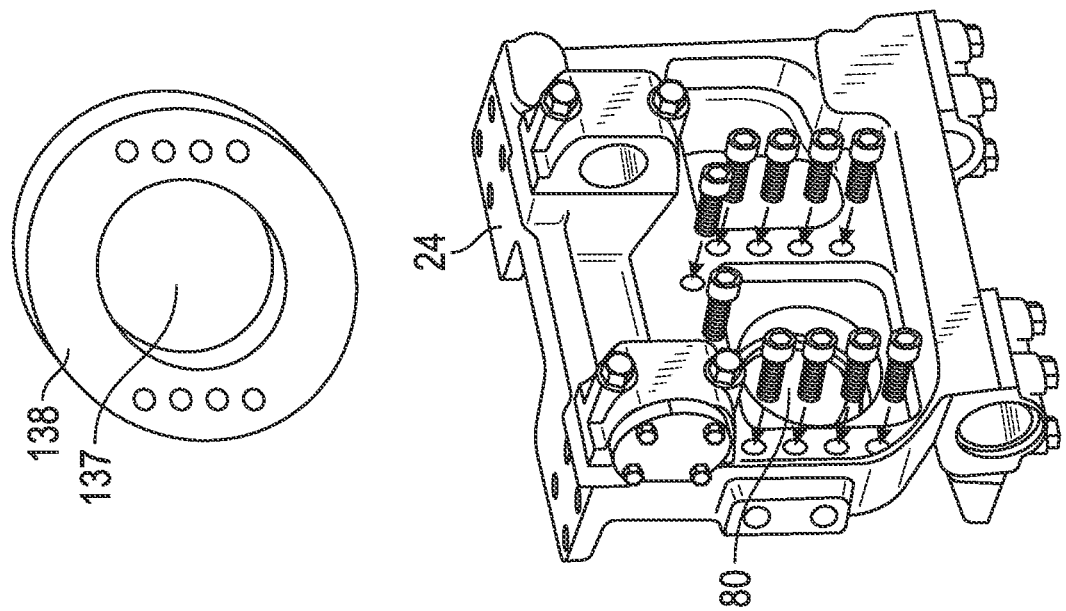

FIG. 9 illustrates a bolt hole pattern for sub-frame 22 that permits a spacer component and/or a flank component to be mounted in different positions with respect to sub-frame 22. With continuing reference to FIGS. 1-8, as illustrated, left side 57 of sub-frame 22 is illustrated as having seven pairs of bolt holes extending into left side 57. As also indicated, spacer component 138 and flank component 24 each have only four pairs of bolt holes. The four pairs of bolt holes of spacer component 138 and of flank component 24 are each configured to align with four consecutive pairs of bolt holes in left side 57.

Configured in this manner, when assembling modular independent suspension 20 or when assembling alternate embodiment 132, spacer 138 and/or flank components 24 may be positioned adjacent left side 57 such that the four pairs of bolt holes of spacer component 138 and/or the four pairs of bolt holes of flank components 24 are aligned with any desired subset of four pairs of bolt holes of left side 57. For example, if a relatively high ride height is desired, then the bolt holes of spacer component 138 and/or flank component 24 may be aligned with a subset 144 comprising the bottom four pairs of bolt holes of left side 57. Conversely, if a relatively low ride height is desired, then the four pairs of bolt holes of spacer component 138 and/or flank component 24 may be aligned with a subset 146 comprising the top four pairs of bolt holes of left side 57. In this manner, the ride height of the vehicle utilizing modular independent suspension 20 can be adjusted simply by attaching spacer component 138 and/or flank component 24 to different bolt holes in sub-frame 22.

It should be understood that although the illustrated embodiment depicts left side 57 as having seven pairs of bolt holes, in other embodiments, any suitable number of pairs of bolt holes in left side 57 employed. Similarly, in other embodiments of spacer component 138 and in other embodiments of flank component 24, a greater or lesser number of pairs of bolt holes may be provided.

Figure 10:
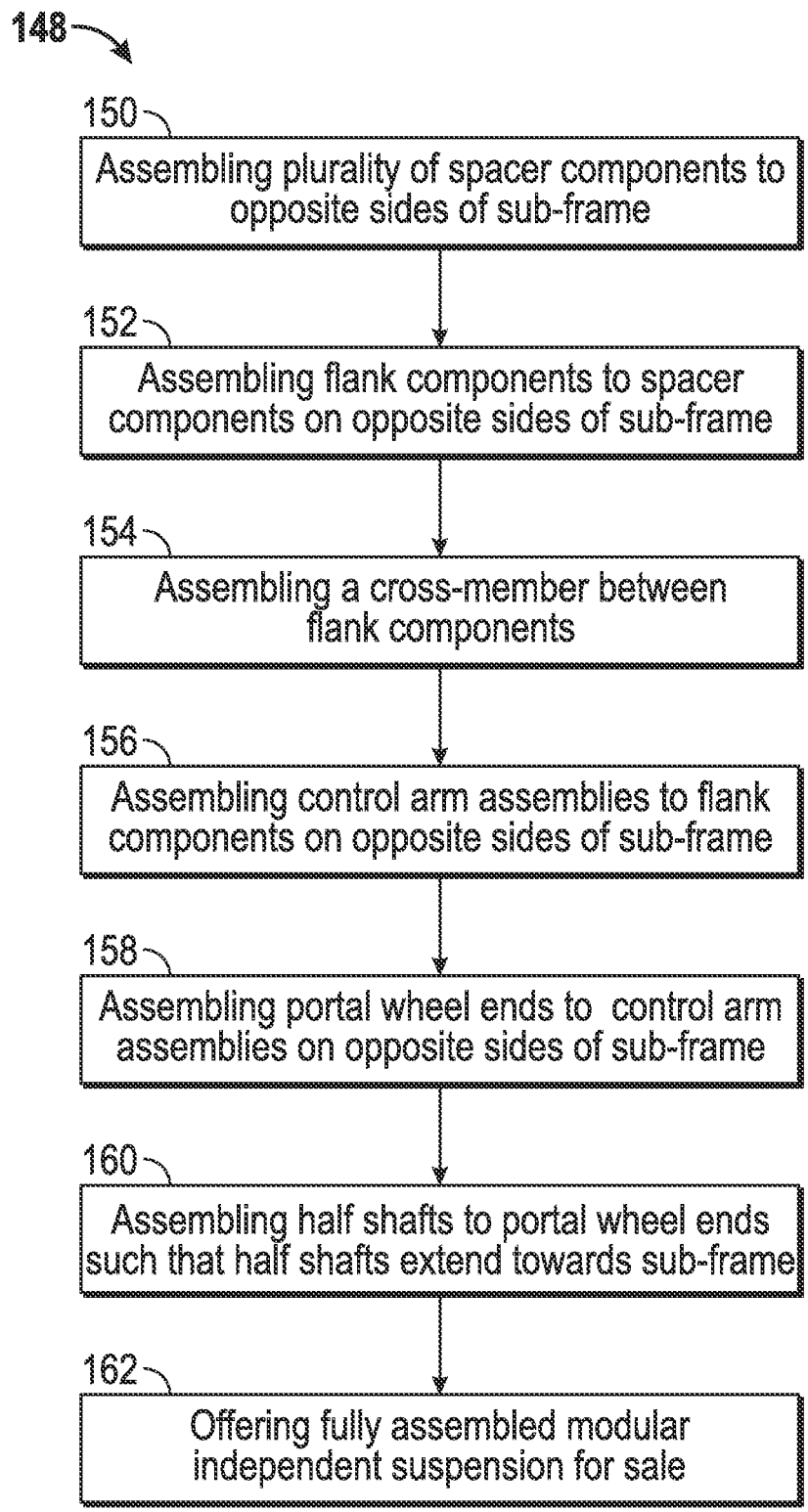
FIG. 10 is a flow diagram illustrating a method for assembling a modular independent suspension having portal wheel ends.

FIG. 10 is a flow diagram illustrating an embodiment of a method 148 for assembling a modular independent suspension having portal wheel ends. With continuing reference to FIGS. 1-9, at step 150, a plurality of spacer components, such as spacer components 136, 138, 140, and 142 are assembled to the left and right side of a sub-frame, such as sub-frame 22. When assembling the spacer components to the sub-frame, bolt holes defined in the spacer component(s) may be aligned with bolt holes or with a subset of bolt holes defined in the sub-frame.

At step 152, flank components, such as flank components 24 and 26, are assembled to the spacer components, with the flank components being positioned on opposite sides of sub-frame 22.

At step 154, a cross-member, such as cross-members 28 and 29, may be attached to the two flank components such that the flank components are coupled to one another. This configuration will enhance the strength and the stiffness of the modular independent suspension created as a result of following process 148.

At step 156, control arm assemblies, such as control arm assembly 30 and control arm assembly 36, are assembled to the flank components. This may entail assembling an upper control arm of each control arm assembly to mounting brackets disposed proximate an upper portion of each flank component and may further entail assembling a lower control arm of each control arm assembly to mounting points disposed proximate a lower portion of each flank component.

At step 158, a portal wheel end, such as portal wheel end 42 and 44, is assembled to each control arm assembly. This will result in the positioning of a portal wheel end on opposite sides of the sub-frame.

At step 160, half shafts, such as half shafts 46 and 48, are assembled to each portal wheel end. The half shafts are positioned so that they extend through bores defined in the flank components, the spacer components, and the left and right sides of the sub-frame. Mounted in this manner, the half shafts are ready to be coupled with a carrier, such as carrier 54, and to deliver torque generated by the carrier to each portal wheel end.

At step 162, the fully assembled modular independent suspension is offered for sale. By offering the modular independent suspension for sale as a single unitary component, it enables an end user to quickly and easily switch out suspensions on vehicles without requiring complicated assembly and/or disassembly of discrete components.

What is claimed is:

1. A modular independent suspension having portal wheel ends, the modular independent suspension comprising:
  a sub-frame configured to receive a carrier, the sub-frame having a first side and a second side, the first side defining a first plurality of sub-frame bolt holes arranged vertically, and the second side defining a second plurality of sub-frame bolt holes arranged vertically;
  a first flank component having a first plurality of first flank bolt holes arranged vertically and configured to align with less than all of the first plurality of sub-frame bolt holes, the first plurality of first flank bolt holes being aligned with a first subset of the first plurality of sub-frame bolt holes and the first flank component being coupled to the first side of the sub-frame via a first plurality of fasteners extending through the first plurality of first flank bolt holes and the first subset of the first plurality of sub-frame bolt holes;
  a second flank component having a second plurality of second flank bolt holes arranged vertically and configured to align with less than all of the second plurality of sub-frame bolt holes, the second plurality of second flank bolt holes being aligned with a second subset of the second plurality of sub-frame bolt holes and the second flank component being coupled to the second side of the sub-frame via a second plurality of fasteners extending through the second plurality of second flank bolt holes and the second subset of the second plurality of sub-frame bolt holes;
  a first control arm assembly coupled to the first flank component;
  a second control arm assembly coupled to the second flank component;
  a first portal wheel end coupled to the first control arm assembly; and
  a second portal wheel end coupled to the second control arm assembly, wherein the first plurality of first flank bolt holes comprises fewer bolt holes than the first plurality of sub-frame bolt holes and wherein the second plurality of second flank bolt holes comprises fewer bolt holes than the second plurality of sub-frame bolt holes, wherein the first flank and the second flank may be selectively mounted to the sub-frame at a plurality of different heights.

2. The modular independent suspension of claim 1, wherein the first control arm assembly comprises a first upper control arm and a first lower control arm and wherein the second control arm assembly comprises a second upper control arm and a second lower control arm.

3. The modular independent suspension of claim 1, wherein a first sub-frame bore is defined in the first side of the sub-frame, wherein a second sub-frame bore is defined in the second side of the sub-frame, wherein a first flank bore is defined in the first flank component, wherein a second flank bore is defined in the second flank component, wherein the first flank bore is substantially aligned with the first sub-frame bore, and wherein the second flank bore is substantially aligned with the second sub-frame bore.

4. The modular independent suspension of claim 3, wherein a first half shaft is coupled to the first portal wheel end such that the first half shaft extends through the first flank bore and the first sub-frame bore, and wherein a second half shaft is coupled to the second portal wheel end such that the second half shaft extends through the second flank bore and the second sub-frame bore.

5. The modular independent suspension of claim 1, further comprising:
 a first spacer component disposed between the first flank component and the first side of the sub-frame; and
 a second spacer component disposed between the second flank component and the second side of the sub-frame.

* * * * *